United States Patent [19]
Wiley

[11] Patent Number: 5,644,574
[45] Date of Patent: Jul. 1, 1997

[54] NOISE CANCELING SINGLE RETURN CONDUCTOR FOR MULTIPLE SIGNAL CARRYING CONDUCTORS

[75] Inventor: George A. Wiley, San Diego, Calif.

[73] Assignee: Hughes Electronics, Los Angeles, Calif.

[21] Appl. No.: 546,363

[22] Filed: Oct. 20, 1995

[51] Int. Cl.$^6$ .................................................. H04B 1/56
[52] U.S. Cl. .................................. 370/276; 381/94.1
[58] Field of Search .................................. 370/27, 32, 24,
370/6, 201, 282, 283, 284, 276; 375/257;
381/94; 340/536, 533, 531

[56] References Cited

U.S. PATENT DOCUMENTS 5,537,011   7/1996   Bachman et al. ..................... 318/99

Primary Examiner—Douglas W. Olms
Assistant Examiner—Matthew C. Phillips
Attorney, Agent, or Firm—John Whelan; Wanda Denson-Low

[57] ABSTRACT

A system for noise canceling using a single return conductor. The system employs a first unit, a full duplex communications path coupled to the first unit, and a second unit coupled to the first unit via the full duplex communications path. The full duplex communications path employs at least three conductors: a forward signal carrying conductor; a reverse signal carrying conductor; and a single return conductor. In order to perform noise canceling, the first unit may employ, for example, a first adder coupled to the reverse signal carrying conductor, and a first canceling impedance coupled between the single return conductor and a first unit ground. Similarly, the second unit 12 may employ a second adder coupled to the forward signal carrying conductor, and a second canceling impedance coupled between the single return conductor and a second unit ground.

9 Claims, 3 Drawing Sheets

NOISE CANCELING SINGLE RETURN CONDUCTOR FOR MULTIPLE SIGNAL CARRYING CONDUCTORS

BACKGROUND OF THE INVENTION

The present invention relates noise canceling, and more particularly to noise canceling using a single return conductor. Even more particularly, the present invention relates to noise cancelling using a single return conductor for cancelling noise in multiple signal carrying conductors.

Many systems that employ a full duplex signal path, i.e., a signal path in which signals can be transmitted and received simultaneously between two or more circuit modules, or units, utilize complex and costly approaches to canceling noise introduced as a result of differences in ground potential at each of the two circuit modules. Such methods commonly include transmitting and receiving signals differentially, i.e., on respective in-phase and out-of-phase carriers, or by transmitting and receiving a single-ended signal and subtracting differences in ground reference from the signal at the receiving end. Each of these commonly used approaches requires that at least two conductors be used for each of a forward and a reverse signal path. (In the case of transmitting and receiving differentially, one conductor is used for the in-phase carrier and another is used for the out-of-phase carrier. In the case of the single-ended signal from which is subtracted the differences in ground potential, one conductor is used to transmit the single-ended signal, and another conductor carries the ground reference of the unit transmitting the single-ended signal to the unit receiving the single-ended signal.) This necessitates the use of at least four conductors for full duplex operation, and if multiple forward and reverse signal paths are utilized, two conductors may need to be used for each forward and reverse signal path.

For example, in FIG. 1, a schematic diagram is shown of a prior art system for noise canceling, wherein multiple noise canceling return conductors are used to carry ground reference signals for noise canceling in multiple signal carrying conductors.

Shown are a first module 10 (or first unit) and a second module 12 (or second unit) coupled together by a full duplex signal path 14 made up of four individual conductors 16, 18, 20, 22. The particular nature of the first and second units 10, 12 depends upon the particular application to which noise cancelling is applied. For example, noise cancelling may be used when the full duplex signal path 14 is used to carry audio signals between the first and second units 10, 12.

For purposes of this description the first two of the conductors 16, 18 are referred to as a forward signal path, and the second two of these conductors 20, 22 are referred to a reverse signal path.

Within the first unit 10, an output signal is passed through an amplifier 24 and onto a first of the conductors 16. A second of the conductors 18 is coupled to a ground reference 25 within the first unit 10. Within the second unit 12, the first and second conductors 16, 18 are coupled to a adder 26, with the first conductor 16 being coupled to a non-inverting input of the adder 26, and with the second of the conductors 18 being coupled to an inverting input of the adder 26. The sum of the signals on the first conductor 16 and the second conductor 18, as determined by the adder 26, is a noise canceled output 27, which may be used by the second unit 12 in numerous ways, depending on the particular application for which the units 10, 12 are suited.

In a similar manner, a noise canceled input 28 is provided to the first unit 10 from another adder 29. The third conductor 20 provides an amplified input signal to a non-inverting input of the adder 29. The amplified input signal is provided to the third conductor 20 by an amplifier 30, which receives an input signal from the second unit 12 and generates the amplified input signal in response thereto. The fourth conductor 22 is coupled to a ground reference 31 within the second unit 12 and is coupled to an inverting input of the adder 29.

As a result of this configuration, noise introduced into the third or fourth conductor 20, 22 is subtracted out of the amplified input signal by the adder 29 in order to create the noise canceled signal at the noise canceled input 29. The noise canceled input signal can be used by the first unit 10 in a manner consistent with the particular application for which the units 10, 12 are suited.

Disadvantageously, the above described prior art system requires that two conductors utilized for each of the forward signal path and the reverse signal path, thus necessitating a total of four wires for the full duplex signal path. When multiple forward signal paths and/or multiple reverse signal paths are to be employed, two conductors may, in some applications, need to be utilized for each of the forward signal paths and/or reverse signal paths. Similarly, when signals are transmitted and/or received differentially, i.e., modulated onto in phase and out of phase carriers, two conductors must be utilized for each forward signal path and for each reverse signal path. Thus, what is needed is a system that provides for noise cancellation using fewer than two conductors for each signal path, and preferably using only a single return conductor for multiple forward and reverse signal carrying conductors.

The present invention advantageously addresses the above and other needs.

SUMMARY OF THE INVENTION

The present invention advantageously addresses the needs above as well as other needs by providing for noise canceling using a single return conductor for multiple signal carrying conductors.

In accordance with one embodiment, the invention can be characterized as a system for noise canceling using a single return conductor. The system employs a first unit, a full duplex communications path coupled to the first unit, and a second unit coupled to the first unit via the full duplex communications path. The first and second units may, for example, be audio components and the full duplex communications path may be an audio channel. For example, the first unit may be a cellular telephone and the second unit may be a docking station or "smart" booster with forward and reverse audio signals passed therebetween via the full duplex communications path.

The full duplex communications path employs at least three conductors: a forward signal carrying conductor; a reverse signal carrying conductor; and a single return conductor. Significantly, only a single reference conductor, i.e., exactly one reference conductor, is needed for noise canceling in the present embodiment. This is true even if multiple forward and/or reverse signal carrying conductors are employed.

In order to perform noise canceling, the first unit may employ, for example, a first adder coupled to the reverse signal carrying conductor, and a first canceling impedance coupled between the single return conductor and a first unit ground. Similarly, the second unit may employ a second adder coupled to the forward signal carrying conductor, and a second canceling impedance coupled between the single return conductor and a second unit ground. The first and second adders are coupled to respective ends of the single reference conductor, and are used to subtract noise from forward and reverse signals carried on the forward and reverse signal carrying conductors by subtracting a reference signal carried on the single reference conductor from the forward and reverse signals carried on the forward and reverse signal carrying conductors.

In one variation of the present embodiment, the first unit further uses a first multiplier coupled between the single return conductor and the first adder, and the second unit uses a second multiplier coupled between the single return conductor and the second adder in order to amplify the reference signal before it is subtracted from the forward and reverse signals, respectively.

In a particular variation of the present embodiment, operational amplifiers, in combination with impedance devices, are employed to carry out the functions of the first and second adders, the first and second multipliers and the first and second canceling impedances.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
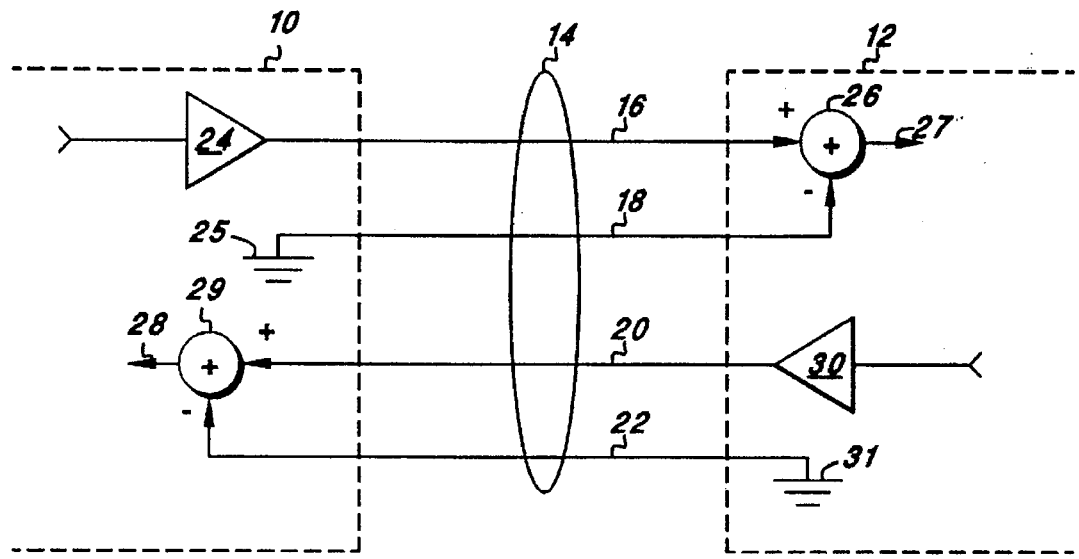
FIG. 1 is a schematic diagram of a prior art system for noise canceling, wherein multiple noise canceling return conductors are used to provide for noise canceling in multiple signal carrying conductors.

FIG. 1 is described hereinabove in the section entitled BACKGROUND OF THE INVENTION.

Figure 2:
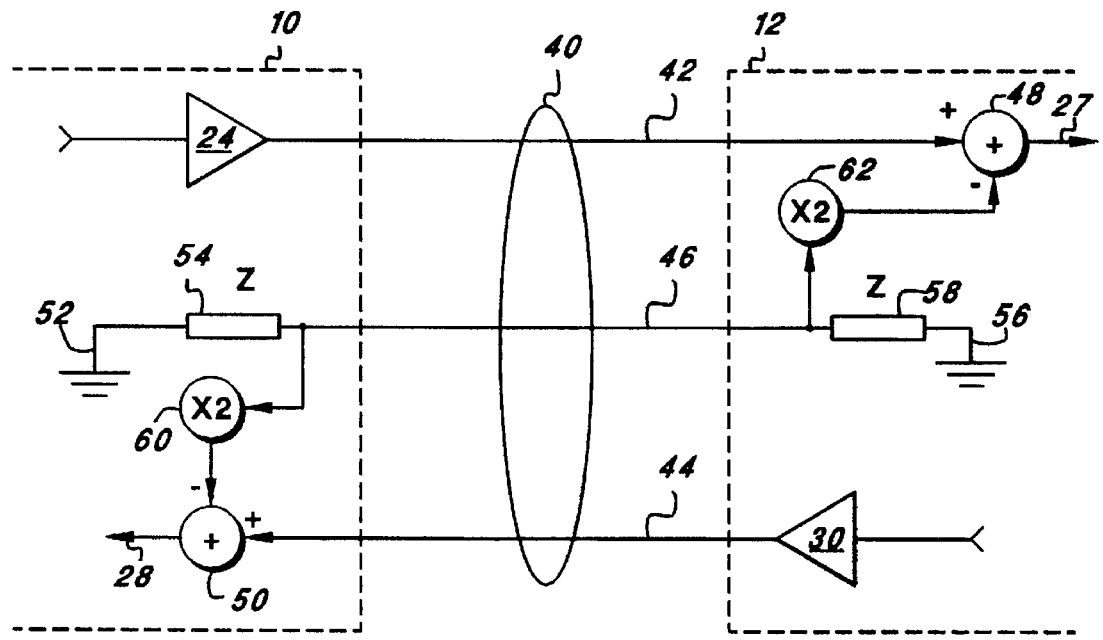
FIG. 2 is a schematic diagram of a system for noise canceling in accordance with one embodiment of the present invention, wherein a single return conductor is used to provide for noise canceling in multiple signal carrying conductors, and wherein identical reference impedances are employed between each end of the single reference conductor and respective unit grounds.

Referring to FIG. 2, a schematic diagram is shown of a system for noise cancelling in accordance with one embodiment of the present invention, wherein a single return conductor is used to provide for noise cancelling in multiple signal carrying conductors, and wherein identical reference impedances are employed between each end of the single reference conductor and respective unit grounds.

Shown is a first module 10 (or first unit) and a second module 12 (or second unit) coupled together by a full duplex signal path 40. The full duplex signal path 40 employs a forward signal carrying conductor 42, a reverse signal carrying conductor 44, and a single reference conductor 46. Within the first unit 10, the forward signal carrying conductor 42 is coupled to an output through an amplifier 24. Within the second unit 12 the forward signal carrying conductor is coupled to a non-inverting input of the adder 48. An output of the adder 48 serves as a noise cancelled input to the second unit 12. Also within the second unit 12, another output is connected through another amplifier 30 to the reverse signal carrying conductor 44. Within the first unit 10 the reverse signal carrying conductor 44 is coupled to a non-inverting input of another adder 50, the output of which serves as a noise cancelled input to the first unit 10.

In order to effect noise cancellation using the single reference conductor 46, one end of the single reference conductor 46 is coupled to a first signal ground 52 through an impedance 54 within the first unit 10. The other end of the single reference conductor 46 is coupled within the second unit 12 to a second signal ground 56 through an approximately identical impedance 58. In addition to being coupled to the impedance 54, within the first unit 10, the respective end of the single reference conductor 46 is coupled to an inverting input of the adder 50 via a multiplier 60. The multiplier 60 multiplies a reference signal on the single reference conductor 46 by two before presenting the multiplied reference signal to the inverting input of the adder 50. Similarly, the single reference conductor 46, in addition to being coupled the approximately identical impedance 58, is coupled through another multiplier 62 within the second unit 12 to an inverting input of the adder 48. As with the multiplier 60, the other multiplier 62 multiplies the reference signal by two before presenting the multiplied reference signal to the inverting input of the adder 48.

Because the two impedances 54, 58 are equal, voltage difference between the grounds 52, 56 of the two units 10, 12 is divided by two on the single reference conductor 46. This is because the two equal impedances 54, 58 form a voltage divider. This signal, i.e., the reference signal, is then multiplied by two by the multipliers 60, 62 within each of the units 10, 12 (so as to undo the division by two performed by the voltage divider) before being subtracted from the signal on each of the signal carrying conductors 42, 44 by the adders 48, 50. In this way, the voltage difference between the grounds 52, 56, which constitutes "noise," is "cancelled" by the present embodiment.

Figure 3:
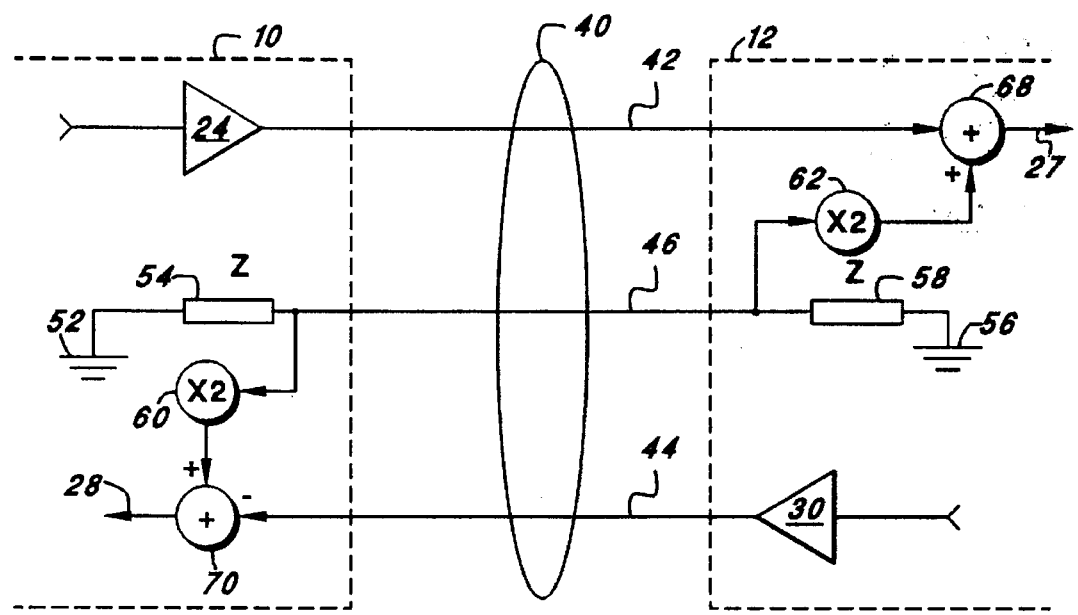
FIG. 3 is a schematic diagram of a system for noise canceling in accordance with a variation of the one embodiment of the present invention shown in FIG. 2, wherein identical reference impedances are employed between each end of the single reference conductor and respective unit grounds, and wherein signals on the multiple signal carrying conductors are inverted by respective adders.

Referring next to FIG. 3, a schematic diagram is shown of a system for noise canceling in accordance with a variation of the present embodiment, wherein identical reference impedances are employed between each end of the single reference conductor and respective unit grounds, and wherein signals on the multiple signal carrying conductors are inverted.

Shown is the first module 10 and the second module 12 coupled together by the full duplex signal path 40. The full duplex signal path 40 employs the forward signal carrying conductor 42, the reverse signal carrying conductor 44, and the single reference conductor 46. Within the first unit 10, the forward signal carrying conductor 42 is coupled to the output through the amplifier 24. Within the second unit 12 the forward signal carrying conductor is coupled to an inverting input for an adder 68, which differs from the variation shown in FIG. 2 in that in FIG. 2 the forward signal carrying conductor 42 is coupled to the non-inverting input of the adder 48. The output of the adder 68 serves as the noise canceled input to the second unit 12.

Also within the second unit 12, the other output is coupled through the other amplifier 30 to the reverse signal carrying conductor 44. Within the first unit 10 the reverse signal carrying conductor 44 is coupled to an inverting input of another adder 70, the output of which serves as the noise canceled input to the first unit 10. (This also differs from the variation shown in FIG. 2 in that in FIG. 2 the reverse signal carrying conductor 44 is coupled to the non-inverting input of the other adder 50.).

As in the variation of FIG. 2, in order to effect noise cancellation using the signal reference conductor 46, one end of the single reference conductor 46 is coupled to the first signal ground 52 through the impedance 54 within the first unit 10. The other end of the single reference conductor 46 is coupled within the second unit 12 to the second signal ground 56 through the approximately identical impedance 58. In addition to being coupled to the impedance 54 within the first unit 10, the single reference conductor 46 is coupled to a non-inverting input of the adder 70 via the multiplier 60. (This differs from the variation of FIG. 2 in that the single reference conductor in FIG. 2 is coupled to an inverting input of the adder 50 via the multiplier 60.).

The multiplier 60 is coupled between a respective end of the single reference conductor 46 and the non-inverting input of the adder 70, and multiplies a reference signal on the single reference conductor 46 by two before presenting the multiplied reference signal to the non-inverting input of the adder 70. Similarly, the single reference conductor 46, in addition to being coupled the approximately identical impedance 58, is coupled through another multiplier 62 to the non-inverting input of the adder 68. As with the multiplier 60, the other multiplier 62 multiplies the reference signal by two before presenting the multiplied reference signal to the inverting input of the other adder 68.

Because the two impedances 54, 58 are equal, voltage difference between the grounds 52, 56 of the two units 10, 12 is divided by two on the single reference conductor. This is because the two equal impedances 54, 58, form a voltage divider. This signal, i.e., the reference signal, is then multiplied by two by the multipliers 60, 62 within each of the units 10, 12 before being "added to" the signals on each of the signal carrying conductors 42, 44 by the adders 68, 70. (The multiplied reference signal is "added to" the signals in each of the signal carrying conductors 42, 44, because these signals are inverted by the adders 68, 70.).

The variation shown in FIG. 3, while perhaps less intuitive than the variation of FIG. 2 because noise appears to be "added to" rather than "subtracted from" the forward and reverse signals is likely preferred due to the fact that inversion of the forward and reverse signals is frequently desirable in applications, such as audio signal transmission, with which the present embodiment may be useful.

Figure 4:
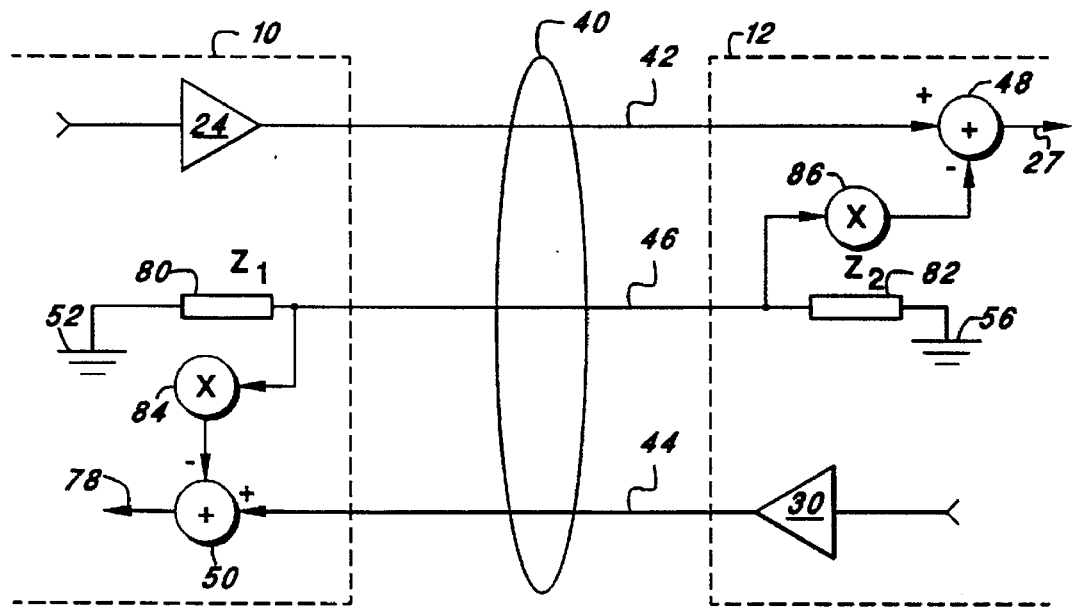
FIG. 4 is a schematic diagram of a system for noise canceling in accordance with another variation of the one embodiment of the present invention shown in FIG. 2, wherein differing reference impedances are employed between each end of the single reference conductor and respective unit grounds.

Referring next to FIG. 4, a schematic diagram is shown of a system for noise cancelling in accordance with another variation of the present embodiment, wherein differing reference impedances are employed between each end of the single reference conductor and respective unit grounds.

Shown is the first module 10 and the second module 12 coupled together by the full duplex signal path 40. The full duplex signal path 40 employs the forward signal carrying conductor 42, the reverse signal carrying conductor 44, and the single reference conductor 46. Within the first unit 10, the forward signal carrying conductor 42 is coupled to the output through the amplifier 24. Within the second unit 12 the forward signal carrying conductor is coupled to a non-inverting input of the adder 48. An output of the adder 48 serves as a noise canceled input to the second unit 12. Also within the second unit 12, another output is connected through another amplifier 30 to the reverse signal carrying conductor 44. Within the first unit 10 the reverse signal carrying conductor 44 is coupled to a non-inverting input of another adder 50, the output of which serves as a noise canceled input to the first unit 10.

In order to effect noise cancellation using the single reference conductor 46, one end of the single reference conductor 46 is coupled to a first signal ground 52 through a first impedance 80 within the first unit 10. The other end of the single reference conductor 46 is coupled within the second unit 12 to a second signal ground 56 through a second impedance 82. Unlike in the variation of FIG's. 2 and 3, the impedances 80, 82 need not be equal. In addition to being coupled to the impedance 80, within the first unit 10, the single reference conductor 46 is coupled to the inverting input of the adder 50 via first multiplier 84. The first multiplier 84 multiplies a reference signal on the single reference conductor 46 by a factor $C_1$ as derived below before presenting the multiplied reference signal to the inverting input of the adder 50. Similarly, the single reference conductor 46, in addition to being coupled the second impedance 82, is coupled through another multiplier 86 to an inverting input of the adder 48. As with the multiplier 84, the other multiplier 86 multiplies the reference signal by another factor $C_2$ before presenting the multiplied reference signal to the inverting input of the other adder 48.

Because the two impedances 80, 82 are not equal, the reference signal is divided within each of the units 10, 12, by a different amount with respect to the ground reference within each unit 10, 12. The unit 10, 12 functioning as a receiver, i.e., as a receiver unit, must multiply the reference signal by a reciprocal of a division ratio, which is a function of the two impedances apparent to the receiver. The product of this multiplication must then be subtracted from the signal on the signal carrying conductor from the other unit, i.e., the transmitter unit.

The factors $C_1$ and $C_2$, or division radios, mentioned above are derived for each of the units as follows. For the first unit 10, the factor $C_1$ is as follows:

$$\frac{Z_1 + Z_2}{Z_1}$$

where $Z_1$ is the first impedance 80 and $Z_2$ is the second impedance 82. This derivation assumes that the impedance in the single reference conductor 46 is minimal when compared to the two impedances 80, 82. If this assumption is not true in a particular application, the factor $C_1$ for the multiplier 84 in the first unit 10 is as follows:

$$\frac{Z_1 + Z_2 + Z_w}{Z_1}$$

where $Z_1$ and $Z_2$ are the first and second impedances 80, 82, respectively, and wherein $Z_w$ is the impedance of the single reference conductor 46. In most cases, however, it is preferred that the two impedances 80, 82 be selected so that the impedance of the single reference conductor 46 is minimal compared to the two impedances 80, 82. Derivation of the factor $C_2$ is achieved in a similar manner, and will be apparent to one of skill in the art based on the above derivation of the factor $C_1$.

Figure 5:
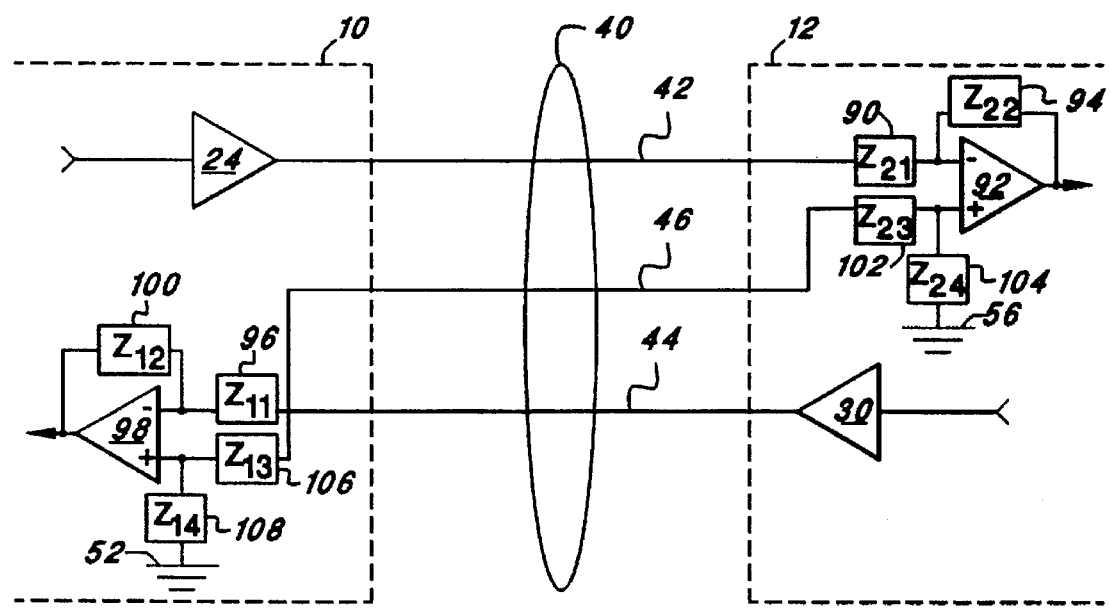
FIG. 5 is a schematic diagram of a system for noise canceling in accordance with a further variation of the one embodiment of the present invention shown in FIG. 2, wherein a combination of operational amplifiers and impedances that function as the reference impedances, as incoming signal amplifier/inverters, and as adders for noise cancelling, are employed between each end of the single reference conductor and respective unit grounds, and at input ends of the respective signal carrying conductors.

Referring next to FIG. 5, a schematic diagram is shown of a system for noise canceling in accordance with a further variation of the present embodiment, wherein a combination of operational amplifiers and impedances that function as the reference impedances, as incoming signal amplifier/inverters and as noise cancelling adders, are employed between each end of the single reference conductor and respective unit grounds, and at input ends of the respective signal carrying conductors.

Shown is the first module 10 and the second module 12 coupled together by the full duplex signal path 40. The full duplex signal path employs the forward signal carrying conductor 42, the reverse signal carrying conductor 44, and the single reference conductor 46. Within the first unit 10, the forward signal carrying conductor 42 is coupled to the output through the amplifier 24. Within the second unit 12 the forward signal carrying conductor is coupled through a first impedance 90 to an inverting input of a first operational amplifier 92. An output of the operational amplifier 92 serves as a noise canceled input to the second unit 12 and is coupled to the inverting input of the first operational amplifier 92 through a second impedance 94 so as to form a feedback path.

Also within the second unit 12, another output is connected through the other amplifier 30 to the reverse signal carrying conductor 44. Within the first unit 10 the reverse signal carrying conductor 44 is coupled through a third impedance 96 to an inverting input of another operational amplifier 98, the output of which serves as a noise canceled input to the first unit 10. The output of the other operational amplifier 98 is coupled to the inverting input of the other operational amplifier 98 through a fourth impedance 100 so as to form another feedback path.

In order to effect noise cancellation within the second unit 12 using the single reference conductor 46, one end of the single reference conductor 46 is coupled to a non-inverting input of the operational amplifier 92 through a fifth impedance 102, and the non-inverting input of the operational amplifier 92 is coupled to the second signal ground 56 through a sixth impedance 104. Within the first unit 10, the other end of the single reference conductor 46 is coupled to a non-inverting input of the other operational amplifier 98 through a seventh impedance 106, and the non-inverting input of the other operational amplifier 98 is coupled to the first signal ground 52 through an eighth impedance 108.

In order to determine what values are to be used for, for example, the first, second, fifth and sixth impedances 90, 94, 102, 104 in the second unit 12, the particular amplification desired for the noise compensated signal must be selected and the multiplication factor $C_2$ for the reference signal must be determined based on the impedance seen through each end of the single reference conductor 46. Generally, similar values for the impedances 96, 100, 106, 108 in the first unit 10 will be selected so as to simplify the selection of impedances. However, dissimilar impedances may alternatively be used, as was demonstrated in reference to FIG. 4, and may be desirable in a particular application of the present embodiment.

Specifically, the values of the first, second, fifth and sixth impedances 90, 94, 102, 104 will determine the impedance seen by the second unit 12 end of the single reference conductor 46 as follows:

$$Z_2 = Z_{23} + Z_{24}$$

where $Z_{23}$ is the fifth impedance 102 and $Z_{24}$ is the sixth impedance 104. The gain applied to the forward signal is as follows:

$$\frac{-Z_{22}}{Z_{21}}$$

where $Z_{21}$ is the first impedance 90 and $Z_{22}$ is the second impedance 94.

The gain applied to the reference signal on the single reference conductor 46 is as follows:

$$\frac{(Z_{22} + Z_{21})Z_{24}}{Z_{21}(Z_{23} + Z_{24})}$$

where $Z_{21}$, $Z_{22}$, $Z_{23}$ and $Z_{24}$ are impedances as defined above. This gain is selected to be equal to the reciprocal of the division ratio, as mentioned in reference to FIG. 4, which is a function of the impedances $Z_1$ and $Z_2$ as follows:

$$\frac{Z_1 + (Z_{23} + Z_{24}) + Z_W}{(Z_{23} + Z_{24})}$$

As these derivations are well within the knowledge of one skilled in the art, after having read the descriptions herein, further explanation and derivation is not needed and is therefore not made herein.

While the invention herein disclosed has been described by means of specific embodiments and applications thereof, numerous modifications and variations could be made thereto by those skilled in the art without departing from the scope of the invention set forth in the claims.

What is claimed is:

1. A system for noise canceling using a single return conductor, the system comprising:
   a first unit;
   a full duplex communications path coupled to the first unit, the full duplex communications path comprising:
   a forward signal carrying conductor;
   a reverse signal carrying conductor; and
   a single return conductor;
   a first canceling impedance coupled between the single return conductor and a first unit ground;
   a second unit coupled to the first unit via the full duplex communications path; and
   a second canceling impedance coupled between the single return conductor and a second unit ground.

2. The system of claim 1 wherein:
   said first unit comprises:
   a first adder coupled to the reverse signal carrying conductor; and
   said second unit comprises:
   a second adder coupled to the forward signal carrying conductor.

3. The system of claim 2 wherein:
   said first unit further comprises a first multiplier coupled between the single return conductor and the first adder; and said second unit further comprises a second multiplier coupled between the single return conductor and the second adder.

4. The system of claim 3 wherein:

said reverse signal carrying conductor is coupled to a non-inverting input of said first adder;

said first multiplier is coupled to an inverting input of said first adder;

said forward signal carrying conductor is coupled to a non-inverting input of said second adder; and said second multiplier is coupled to an inverting input of said second adder.

5. The system of claim 3 wherein:

said reverse signal carrying conductor is coupled to an inverting input of said first adder;

said first multiplier is coupled to a non-inverting input of said first adder;

said forward signal carrying conductor is coupled to an inverting input of said second adder; and said second multiplier is coupled to a non-inverting input of said second adder.

6. The system of claim 3 wherein said first adder, said first multiplier and said first canceling impedance comprise:

a first operational amplifier;

a first signal input impedance coupled between a first input of the first operational amplifier and said reverse signal carrying conductor;

a first feedback impedance coupled between the first input of the first operational amplifier and an output of the first operational amplifier;

a first grounding impedance coupled between a second input of the first operational amplifier and said first unit ground; and a first reference input impedance coupled between the first input of the first operational amplifier and said single reference conductor.

7. The system of claim 6 wherein said second adder, said second multiplier and said second canceling impedance comprise:

a second operational amplifier;

a second signal input impedance coupled between a second input of the second operational amplifier and said forward signal carrying conductor;

a second feedback impedance coupled between the second input of the second operational amplifier and an output of the second operational amplifier;

a second grounding impedance coupled between a second input of the second operational amplifier and said second unit ground; and a second reference input impedance coupled between the second input of the second operational amplifier and said single reference conductor.

8. The system of claim 7 wherein:

said reverse signal carrying conductor is coupled to a non-inverting input of said first operational amplifier through said first signal input impedance; and said forward signal carrying conductor is coupled to a non-inverting input of said second operational amplifier through said second signal input impedance.

9. The system of claim 7 wherein:

said reverse signal carrying conductor is coupled to an inverting input of said first operational amplifier through said first signal input impedance; and said forward signal carrying conductor is coupled to an inverting input of said second operational amplifier through said second signal input impedance.

* * * * *